United States Patent [19]
Russ, Sr.

[11] 3,767,275
[45] Oct. 23, 1973

[54] STIFFENER AND TRACTION ELEMENT FOR ENDLESS TRACK
[75] Inventor: Paul E. Russ, Sr., Englewood, Colo.
[73] Assignee: The Gates Rubber Company, Denver, Colo.
[22] Filed: Apr. 19, 1972
[21] Appl. No.: 245,418

[52] U.S. Cl. .................................................. 305/38
[51] Int. Cl. ............................................ B62d 55/24
[58] Field of Search .................. 305/38, 35 EB, 54, 305/37

[56] References Cited
UNITED STATES PATENTS
3,612,626  10/1971  Fuchs ............................... 305/38
3,582,155  6/1971  Marier .............................. 305/38

FOREIGN PATENTS OR APPLICATIONS
1,117,612  2/1956  France ............................. 305/38

OTHER PUBLICATIONS
Safety First — Advertising Brochure of Talonic Inc. Victoria, Minn. May 21, 1971 180-5.

Primary Examiner—Richard J. Johnson
Attorney—Raymond Fink et al.

[57] ABSTRACT
An embedable stiffener for transversely reinforcing and providing a wear surface for an endless track. The stiffener includes a traction element that extends exteriorly of the track.

20 Claims, 10 Drawing Figures

Patented Oct. 23, 1973 3,767,275

STIFFENER AND TRACTION ELEMENT FOR ENDLESS TRACK

BACKGROUND OF THE INVENTION

The invention relates to wheel substitutes for land vehicles, but more particularly, the invention relates to an embedable transverse stiffener having an exteriorly extending traction element and optionally, wear elements for endless track.

It is recognized as being advantageous to reinforce endless track with a plurality of spaced-apart, transversely oriented stiffeners. The stiffeners reinforce the track to provide a generally flat platform which is a characteristic recognized as being desirable, especially for snowmobile racing. Another track characteristic desirable for snowmobile racing is traction on ice. To achieve ice traction, it is typical to attach a plurality of ice cleats or traction elements to the track thread. The traction elements are generally attached by fasteners that extend through the track. The fasteners per se may preclude the traction elements from being in alignment with wheels, slide-bars or other track suspension system components. Each ice cleat and fastener slightly impairs flexibility of the track while adding undesirable weight which increases track inertia. The ice cleat attachment means may destroy a portion of the tensile section of a track, while simultaneously introducing localized stress points in the track.

SUMMARY OF THE INVENTION

In accordance with the invention, a track stiffener or reinforcement is provided which includes an ice cleat or optionally, a wear resistant surface. The stiffener has a general rod shape. The traction elements extend as a protuberance from the stiffener while the wear surface may be part of or attached to the stiffener. A plurality of stiffeners are embedded transversely in the body of a polymeric type endless track in a spaced-apart relationship. Preferably, the stiffeners are embedded in transversely extending tread elements of the track for minimum effect on longitudinal flexibility. The traction elements extend from the stiffeners and exteriorly of the track. The stiffeners support the traction elements, thereby eliminating the need for individual traction element fasteners. Concentrated structural loading imparted to the traction elements is distributed along the length of the stiffeners which eliminates occurrence of stress concentrations in the track. When properly arranged, the stiffener, or an attachment thereto, defines a wear resistant surface suitable for engaging a slide-bar suspension system.

Accordingly, an object of the invention is to provide a combination embedable stiffener and traction element.

Another object of the invention is to eliminate individual fasteners for each ice cleat.

It is another object of the invention to provide a method of attaching an exteriorly extending ice cleat or traction element to a track without disturbing the track tensile or reinforcement sections.

Still another object of the invention is to provide a light weight and low inertia track having transverse stiffeners and a plurality of traction elements suited for use over ice.

It is a further object of the invention to provide an integrally molded endless track of the polymeric type which has improved ice traction and transverse stiffness.

Another object of the invention is to provide a reinforcement which defines a wear resistant surface.

These and other objects or advantages of the invention will become more apparent from reviewing the drawing and description thereof wherein.

DESCRIPTION OF PREFERRED EMBODIMENT

Figure 1:
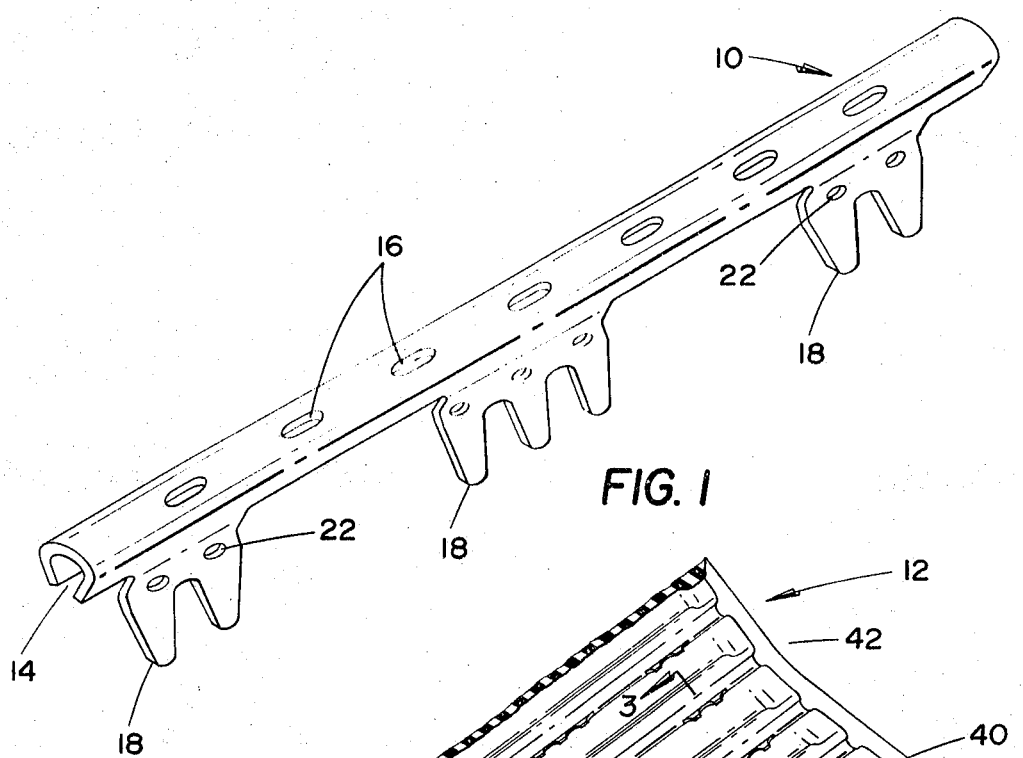
FIG. 1 is an isometric view of a preferable form of the invention.

Referring to FIGS. 1-4, a preferred embodiment of the invention is provided as a transverse stiffener 10 for flexible track 12 of the integrally molded polymeric type. The stiffener 10 is generally rod shape and may have any desired cross-section. Preferably, the reinforcement has a generally horse shoe cross-section 14 which defines a "dove tail" type mechanical interlock when the reinforcement is embedded in a track. The stiffener 10 may be perforated 16 to further enhance the mechanical interlock with the track 12. Polymeric material of the track fills the perforations to define a positive mechanical bond. Care should be taken when locating the perforations to preclude weakening the stiffeners structurally. For example, the perforations 16 may be located along a neutral bending axis or in a section of the stiffener where bending resistance is least required.

At least one traction element 18 extends from the stiffener 10 of the invention. When the stiffener 10 is properly oriented, the traction element extends in a general direction toward the track tread 20 or the ground engaging outer surface. The traction element 18 has a length such that the element extends exteriorly of the track a desired amount. Preferably, the element is located at a point along the stiffener corresponding to a supporting element of a track suspension system, not shown. The elements 18 may have perforations 22 to further enhance mechanical bonding with the polymeric material of the track.

The elements 18 may be of any desired shape to promote a desired traction or strength characteristic. For example, the elements may be bent, angled, or embossed to promote strength while the ground engaging surface of the element may be saw-toothed, flat, curved, or angled to promote a desired traction characteristic.

When the stiffener 10 is used to transversely reinforce track, it is preferably located in a transversely extending tread bar 24 or tread element. The tread bar 24 defines a point where a maximum amount of polymeric material occurs. The polymeric material may be advantageously used to mechanically support and retain the stiffener 10. While the stiffener may have any desired length, maximum imparted reinforcement to the track is achieved when the stiffener has a length substantially equal to the track width. The stiffener 10 is positioned in the tread-bar juxtaposed the track tensile 26 and transverse 28 reinforcement sections. Polymeric material extends into the dove tail 14 and through the traction element and stiffener perforations 16, 22 to define a continuous polymeric matrix that mechanically holds the stiffener 10 in place. Any load or force imparted to the traction element is dispersed along the length of the stiffener and to the track 12. Thus there are no concentrated loads imparted to the track from the elements.

Since the stiffener is held in place by mechanical or adhesion bonding, and the traction elements 18 are supported by the stiffener 10, it is unnecessary to individually fasten each traction element to the track. Elimination of tread element fasteners not only reduce the labor required to make the track but also enhances track performance by reducing inertial weight, and avoiding stress concentration in the track. Also, the longitudinal flexibility of the track is not impaired since the traction element 18 is located at the same point in the track with the stiffener 10. This minimizes the number of longitudinal stiff areas in the track as tread element fasteners are eliminated.

Another advantage associated with the combination stiffener 10 and traction element 18 is that the track tensile member 26 is not disturbed by a fastener. Oftentimes, it is desirable to locate a traction element adjacent or juxtaposed the track drive means. For example, it may be desirable to locate elements below a lug drive means. The lugs may provide directional stability to the track by engaging a track suspension system. Since there must be a tensile section juxtaposed the drive lugs, any fastener holding in a traction element would impair the track tensile section. Thus in accordance with the invention, the track tensile section 26 is undisturbed in the area adjacent the drive means 30.

A salient feature of the invention is that the traction elements 18 are precisely located and arranged in a uniform manner on the tread surface of the track. The possibility of introducing extraneous forces to the track from mislocated traction elements is virtually eliminated.

Figure 4:
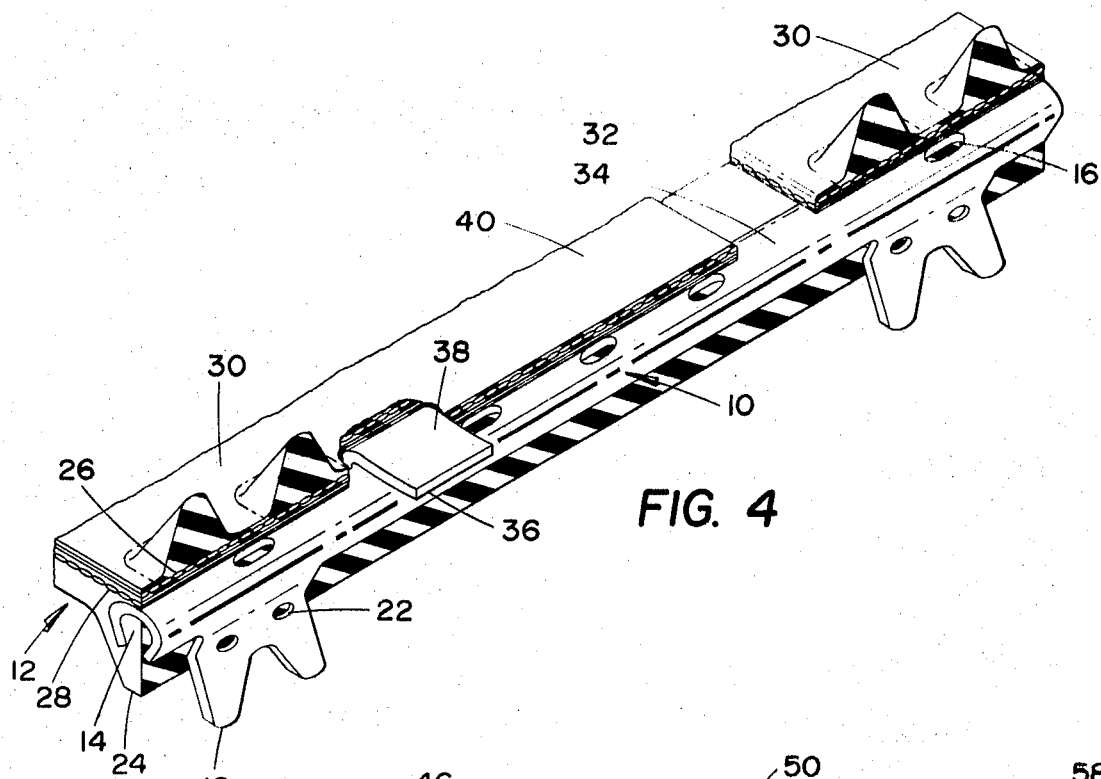
FIG. 4 is an isometric view taken generally along the line 4—4 of FIG. 3 showing the track cutaway from the reinforcement and alternate forms of the invention.
Figures 8, 9, 10:
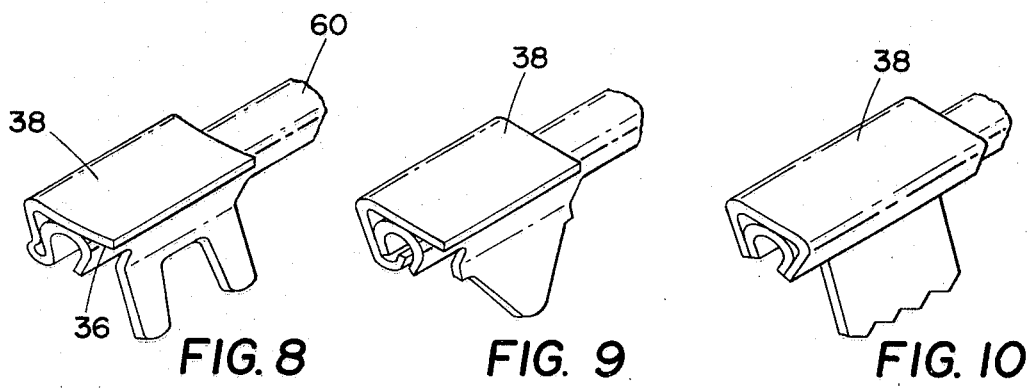
FIG. 8 is a view showing an alternate form of the invention.
FIG. 9 is a view showing an alternate form of the invention.
FIG. 10 is a view showing an alternate form of the invention.

Another feature of the invention is that the reinforcement may also provide a wear resistant surface to be compatible with a track suspension system such as a slide-bar system. Referring to FIGS. 4 and 8, the track may be longitudinally grooved 32 to expose the upper surface 34 of the stiffener, or a tab 36 may extend upward from the stiffener to define a large wear resistant surface 38 near the inner surface 40 of the track. The slide-bar may then be positioned juxtaposed the wear resistant surfaces.

Figure 2:
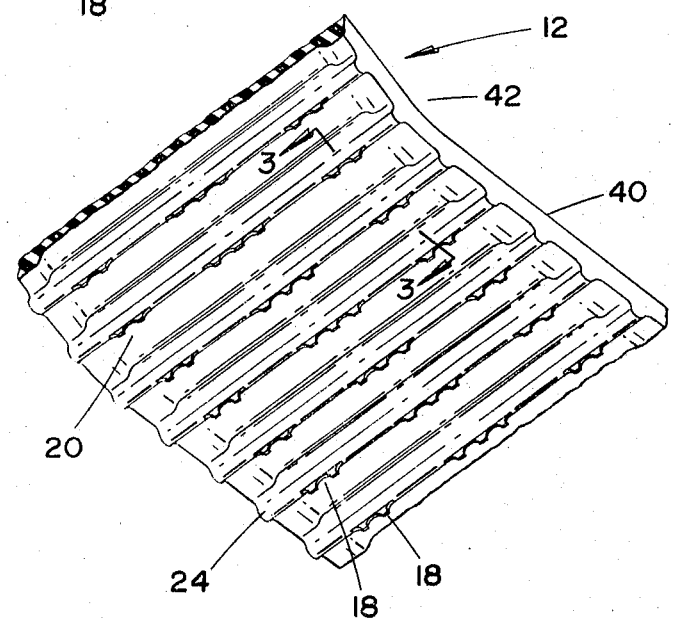
FIG. 2 is a partial isometric view looking up at a portion of track including the reinforcement and traction element combination of the invention.
Figure 3:
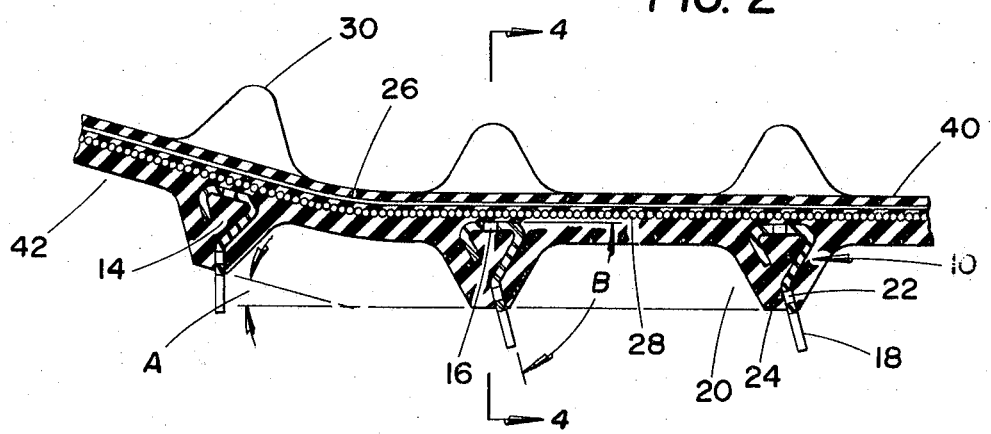
FIG. 3 is an enlarged view taken along the line 3—3 of FIG. 2.

When endless track is adapted for use on a vehicle, it is customary to suspend the leading portion of the track to define a ramp 42 as shown in FIGS. 2 and 3. The angle A which the leading portion of the track makes with the ground is known as the ramp angle. The angle is usually between 10° and 25°. It has been found advantageous to have the exteriorly extending portion of the traction element to be substantially vertical in relation to the ground when the element is on the ramp. The element strikes the ground substantially vertically when arranged in this manner to enhance traction on ice. Thus, the exteriorly extending portion of the traction element is preferably arranged to define an angle B in relation to the track that is substantially between 65 and 90 degrees.

Additional Species

Figures 5, 6, 7:
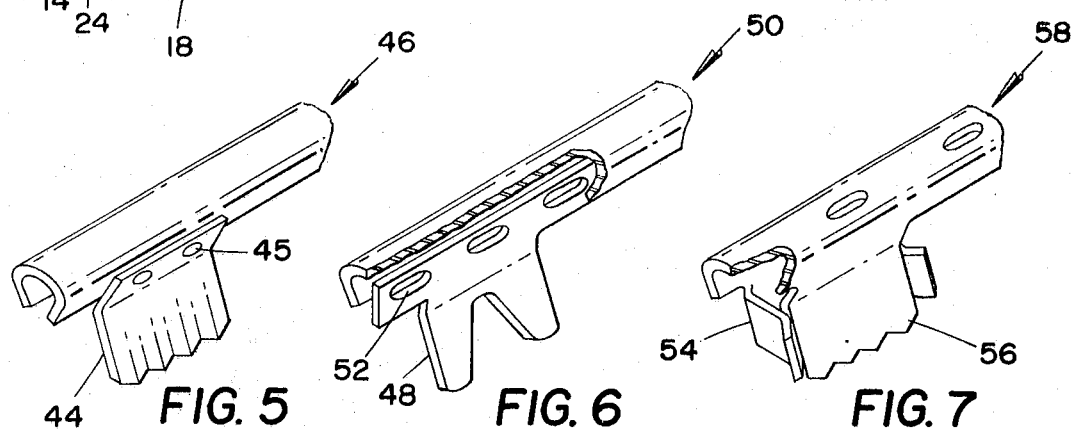
FIG. 5 is a view showing an alternate form of the invention.
FIG. 6 is a view showing an alternate form of the invention.
FIG. 7 is a view showing an alternate form of the invention.

Heretofore, the traction element and wear resistant surface are described in the preferred embodiment as a direct extension or part of the stiffener. The traction element or wear resistant surface may be formed individually and attached, bonded, or interlocked with the stiffener to define an integral unit. Referring to FIG. 5, a separate embossed traction element 44 is attached 45 as an extension to the stiffener 46. The element may be attached with any convenient fastener, by welding, or by adhesive bonding. This construction allows different materials to be advantageously used for the stiffener and the traction element. For example, a spring-type steel may be used for the stiffener while a wear resistant type steel may be used for the traction element.

Referring to FIG. 6, another arrangement is shown for attaching a separate traction element 48 to the stiffener 50. The traction element is preferably perforated 52 where it extends into the stiffener. Polymeric material of the track extends through the perforations and encompasses the stiffener to mechanically bond the traction element in place.

Referring to FIG. 7, a traction element stiffener combination similar to that of FIG. 1 is provided. Two tabs 54, 56 or projections extend down from the stiffener 58 to define the traction element. One tab 54 is crimped around the other tab 56 to provide additional strength. The crimp may be controlled to provide a desired traction element shape.

Referring to FIG. 8 a stiffener 60 is provided having an extended tab portion 36 that defines a wear resistant surface 38 for engagement with a track suspension system. The tab 36 is bent upward to correspond substantially with the inner surface of the track. Optionally, the surface 38 may be slightly concaved to conform to the radius of a track drive or idler wheel. The concave shape also acts as a trap to retain lubricious terrain such as snow or ice.

Referring to FIGS. 9 and 10, the wear resistant surface element like the traction element, may be bonded, welded, perforated, or mechanically interlocked to the stiffener. Wear resistant materials may be advantageously used for the element when it is separately attached to the reinforcement.

The foregoing detailed description is made for purpose of illustration only and is not intended to limit the scope of the invention which is to be determined from the appended claims.

What is claimed is:

1. In an integrally molded endless flexible track with an inner surface and a ground engaging outer surface, the improvement comprising:

means to impart traction and transverse rigidity to said belt, said means including:
      a plurality of longitudinally spaced stiffeners extending transversely of said track embedded between the inner and outer surfaces thereof, and;

spaced traction elements extending from embedded portions of at least one of said stiffeners, through the track, exteriorly of the ground engaging surface, the traction element portions of a stiffener having a cumulative dimension that is less than half the length of the stiffener.

2. A track as set forth in claim 1 wherein said stiffeners are perforated.

3. A track as set forth in claim 1 wherein said traction elements are perforated.

4. A track as set forth in claim 1 wherein said traction elements are embossed.

5. A track as set forth in claim 1 wherein said traction elements extend exteriorly of the track at an angle in relation to the ground engaging surface that is substantially between 65° and 90°.

6. A track as set forth in claim 1 wherein the track has at least one longitudinal groove in the inner surface of sufficient depth to expose a portion of the stiffener to define a wear resistant surface.

7. A track as set forth in claim 1 and further including at least one tab extending from at least one stiffener exteriorly of and substantially at the inner surface of the track to define a wear resistant surface.

8. A track as set forth in claim 1 and further including at least one clip interlocked with and extending from near at least one stiffener exteriorly of and substantially at the inner surface of the track to define a wear resistant surface.

9. In an integrally molded endless flexible track with an inner surface and a ground engaging outer surface, the improvement comprising:
   means to impart traction and transverse rigidity to said belt, said means including:
      a plurality of longitudinally spaced stiffeners extending transversely of said track embedded between the inner and outer surfaces thereof, and;
      spaced traction elements connected to and extending from embedded portions of at least one of said stiffeners, through the track, exteriorly of the ground engaging surface the traction element connecting portions of the stiffener having a cumulative dimension that is less than half the length of the stiffener.

10. A tract as set forth in claim 9 wherein said stiffeners are perforated.

11. A track as set forth in claim 9 wherein said traction elements are perforated.

12. A track as set forth in claim 9 wherein the track has at least one longitudinal groove in the inner surface of sufficient depth to expose a portion of the stiffener to define a wear resistant surface.

13. A track as set forth in claim 9 and further including at least one tab extending from at least one stiffener exteriorly of and substantially at the inner surface of the track to define a wear resistant surface.

14. A track as set forth in claim 9 and further including at least one clip interlocked with and extending from near at least one stiffener exteriorly of and substantially at the inner surface of the track to define a wear resistant surface.

15. In an integrally molded endless flexible track with an inner surface and a ground engaging outer surface, the improvement comprising:
   means to impart traction and transverse rigidity to said track, said means including:
      a plurality of longitudinally spaced stiffeners extending transversely of said track embedded between the inner and outer surfaces thereof, and;
      transversely spaced traction elements extending from an embedded position in the track near and supported by at least one of said stiffeners, the traction elements with portions extending through the track exteriorly of the ground engaging surface having a cumulative transverse dimension of the extending portions of the element less than half the length of the stiffener.

16. A track as set forth in claim 15 wherein said stiffeners are perforated.

17. A track as set forth in claim 15 wherein said traction elements are perforated.

18. A track as set forth in claim 15 wherein the track has at least one longitudinal groove in the inner surface of sufficient depth to expose a portion of the stiffener to define a wear resistant surface.

19. A track as set forth in claim 15 and further including at least one tab extending from at least one stiffener exteriorly of and substantially at the inner surface of the track to define a wear resistant surface.

20. A track as set forth in claim 15 and further including at least one clip interlocked with and extending from near at least one stiffener exteriorly of and substantially at the inner surface of the track to define a wear resistant surface.

* * * * *